United States Patent
Kim

(10) Patent No.: US 6,199,945 B1
(45) Date of Patent: Mar. 13, 2001

(54) VEHICLE SEAT FOR REVERSIBLE OCCUPANT TRAVEL

(76) Inventor: Hoon Y. Kim, 4806 N. Sawyer, Chicago, IL (US) 60625

( * ) Notice: Subject to any disclaimer, the term of this patent is extended or adjusted under 35 U.S.C. 154(b) by 0 days.

(21) Appl. No.: 09/368,193

(22) Filed: Aug. 4, 1999

(51) Int. Cl.[7] .................................................. B60N 2/32
(52) U.S. Cl. ........................... 297/94; 297/95; 297/237; 297/238; 297/236; 297/256.16; 297/114; 297/383; 296/65.1; 296/64
(58) Field of Search ........................... 297/94, 95, 112, 297/114, 238, 237, 236, 283.1, 383, 256.16; 296/64, 65.16

(56) References Cited

U.S. PATENT DOCUMENTS

| | | | |
|---|---|---|---|
| 645,609 | * | 3/1900 | Schellenbach .......................... 297/94 |
| 1,429,368 | * | 9/1922 | Owler et al. ........................ 297/95 X |
| 2,007,471 | * | 7/1935 | Landgrebe ............................... 297/94 |
| 3,058,769 | | 10/1962 | Willson . |
| 3,097,876 | | 7/1963 | Willson . |
| 3,391,960 | | 7/1968 | Megargle et al. . |
| 4,555,135 | * | 11/1985 | Freeland ........................... 297/237 X |
| 4,756,573 | * | 7/1988 | Simin et al. ...................... 297/238 X |
| 5,000,505 | | 3/1991 | Kawashita et al. ................. 296/65.1 |
| 5,121,964 | * | 6/1992 | Fourrey et al. ....................... 297/237 |
| 5,322,341 | * | 6/1994 | Harrison et al. ........................ 297/94 |
| 5,335,963 | | 8/1994 | Müller et al. . |
| 5,409,293 | * | 4/1995 | Nagaska ............................... 297/236 |
| 5,524,962 | * | 6/1996 | Fulgenzi et al. ................. 297/236 X |
| 5,524,965 | * | 6/1996 | Barley ............................. 297/256.16 |
| 5,549,353 | * | 8/1996 | Gaudet et al. ............. 297/256.16 X |
| 5,639,141 | | 6/1997 | Hanemaayer ..................... 296/64 X |
| 5,722,724 | * | 3/1998 | Takei et al. ...................... 297/114 X |
| 5,820,215 | * | 10/1998 | Dreisbach ....................... 297/256.16 |

FOREIGN PATENT DOCUMENTS

| | | | | |
|---|---|---|---|---|
| 3714-954 | * | 11/1987 | (DE) | .................................... 297/383 |
| 3800-896 | * | 9/1988 | (DE) | .................................... 297/237 |
| 348-374 | * | 12/1998 | (EP) | .................................... 297/238 |
| 323296 | * | 1/1930 | (GB) | .................................... 297/383 |
| 59-18028 | * | 1/1994 | (JP) | ....................................... 297/94 |

* cited by examiner

Primary Examiner—Jose V. Chen
Assistant Examiner—Rodney B. White
(74) Attorney, Agent, or Firm—Welsh & Katz, Ltd.

(57) ABSTRACT

A vehicle seat comprising a seat frame and a seat base with a back support assembly including a first backrest and a second backrest longitudinally movable along the seat frame from a first position to a second position enabling a seated occupant to rest the his back against the first backrest and face in a first direction and reversibly enabling a seated occupant to rest his back against a second backrest and face in a second direction.

21 Claims, 4 Drawing Sheets

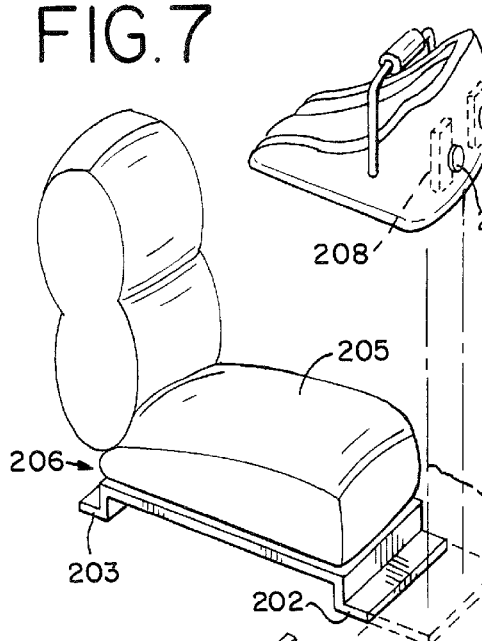
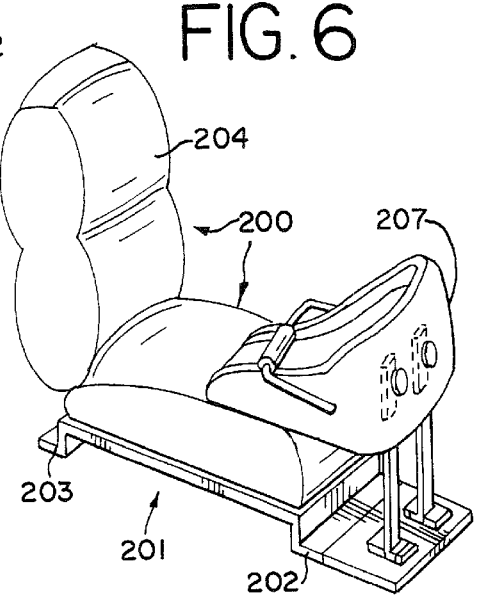
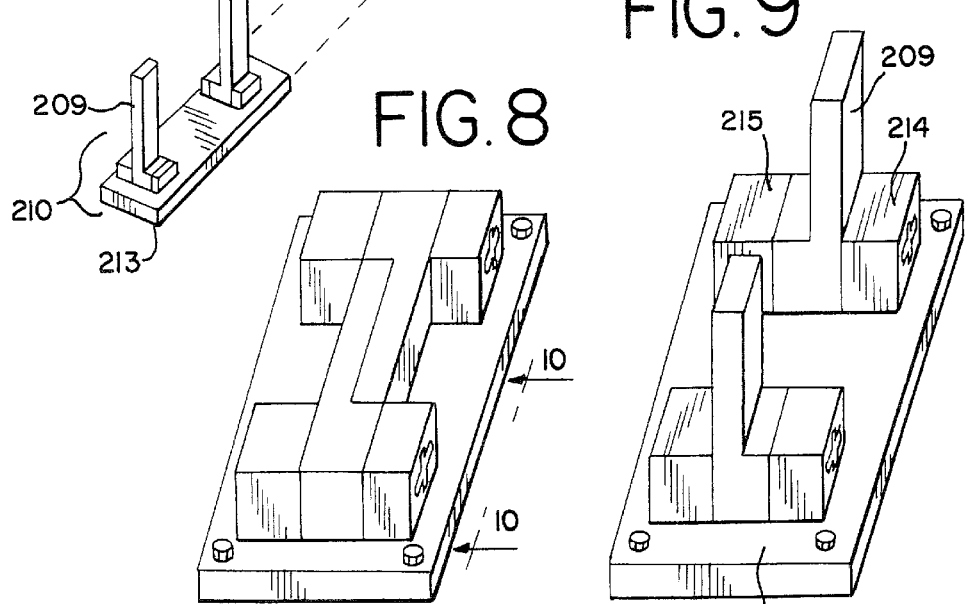
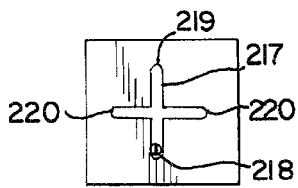
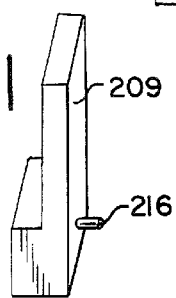

VEHICLE SEAT FOR REVERSIBLE OCCUPANT TRAVEL

BACKGROUND OF THE INVENTION

The present invention generally relates to vehicle occupant seats, and in particular to new and improved occupant seat assemblies wherein the seat assemblies may be modified to enable an occupant to face opposite the vehicle's normal forward traveling direction.

Vehicle occupant safety, particularly the safety of small children and infants is a major concern to both vehicle owners as well as vehicle manufacturers. In most vehicles, the occupant seats are oriented in a forward-facing position. Conventional vehicle seats, for example, include backrests engaged by the occupant's back while disposed on the seat facing in the forward direction of normal vehicle travel. In the event of a sudden stop, such as generally occurs in a vehicle front or rear end collision, the occupant will generally be subjected to a sudden force of inertia acting in the direction of vehicle travel. The potential for injury resulting from such collisions has been reduced somewhat by the mandatory use of seat belts. Although seat belts have proven to be relatively safe for adults, the same cannot be said for small children and infants. Moreover, forward-facing vehicle seats, and particularly front seats, subject children to numerous front seat hazards, such as high-pressure airbags, and generally provide inadequate child restraint systems even with contemporary children's car seats. It is highly important that a vehicle provide the utmost safety for all occupants large and small. It is also important that added vehicle safety remain affordable for car owners as well as manufacturers.

Most forward-facing vehicle seats are fixed in a forward directed position and are incapable of modification to improve safety by reducing the inertia forces imparted to forwardly facing passengers in the event of a collision or the like. Attempts have been made to provide adjustable vehicle passenger seats that may be positioned for forwardly facing or rearwardly facing passenger use. However, known vehicle passenger seats adaptable for both forward-facing and rearward-facing positions are generally relatively complex and expensive, and require at least a 180 degree seat base rotation.

The known reverse-adjustable vehicle seat designs require a complete redesign of the entire base of the seat in order to incorporate both a forward and rearward-facing feature. Thus, a need exists for a vehicle seat assembly that overcomes the disadvantages of known vehicle seats and provides improved safety for infants and small children, as well as adults.

SUMMARY OF THE INVENTION

One of the primary objects of the present invention is to provide a vehicle seat for safer travel, wherein the vehicle seat enables for occupant travel facing in a forward or first position, and is reversible to enable for occupant travel facing in a rearward or second position, such that in a vehicle collision, the back rest substantially offsets forward inertia forces acting on the occupant and provides spinal support protection from high-pressure air bags and shattering windshield glass and the like.

A more particular object of the present invention is to provide a safety vehicle seat enabling occupant travel in a forward-facing or rearward-facing position without rotating the seat base or seat frame and wherein the seat has a first backrest for occupant travel facing in a first direction and a second backrest for occupant travel facing in a second direction.

In accordance with one embodiment of the present invention, the vehicle safety seat has a slidable back support assembly including a first backrest, to provide occupant travel facing in a forward or first position, a second backrest to enable occupant travel facing in rearward or second position, and a slide assembly to enable movement of the back support assembly such that an occupant or operator can longitudinally slide the back support assembly along a seat frame into a selected position.

In accordance with another embodiment of the present invention, a first vehicle seat backrest is pivotally mounted to a seat frame to enable occupant travel facing in a forward or first position, a second backrest sits on top of the seat frame to enable occupant travel facing in an opposite rearward or second position, and a mounting assembly is mounted to the vehicle floor and to provide releasable support to the second backrest.

In accordance with still another embodiment of the present invention, a first vehicle seat backrest of the vehicle seat is pivotally mounted to a seat frame for occupant travel facing in a forward or first position and is pivotal into a lowered generally horizontal position, contacting the seat base, and a second backrest is mounted on top of the first backrest and forms a second seat base such that an occupant seated on the second seat base with the occupant's back resting against the second backrest faces in a rearward or second position.

Further objects, features and advantages of the present invention will become apparent from the following detailed description when taken in conjunction with the accompanying drawings wherein like reference numerals designate like elements throughout several views.

BRIEF DESCRIPTION OF THE DRAWINGS

FIG. 6 is a perspective view of a vehicle seat assembly in accordance with another embodiment of the present invention that enables an infant or small child to sit in a rearwardly facing position;

FIG. 7 is an exploded perspective view of the vehicle seat assembly of FIG. 6;

FIG. 8 is a perspective view of the mounting assembly for the child restraint seat of FIG. 6 but with the pivotal support bars in down non-use positions;

FIG. 9 is a perspective view similar to FIG. 8 but showing the pivotal support bars in upright support positions;

FIG. 10 is an elevational view taken along line 10—10 of FIG. 9, showing a cross-shaped slot to receive a pivotal support bar.

FIG. 11 is a perspective view of a pivotal support bar, employed in the mounting assembly of FIG. 9 with a guide pin;

DETAILED DESCRIPTION

Figure 1:
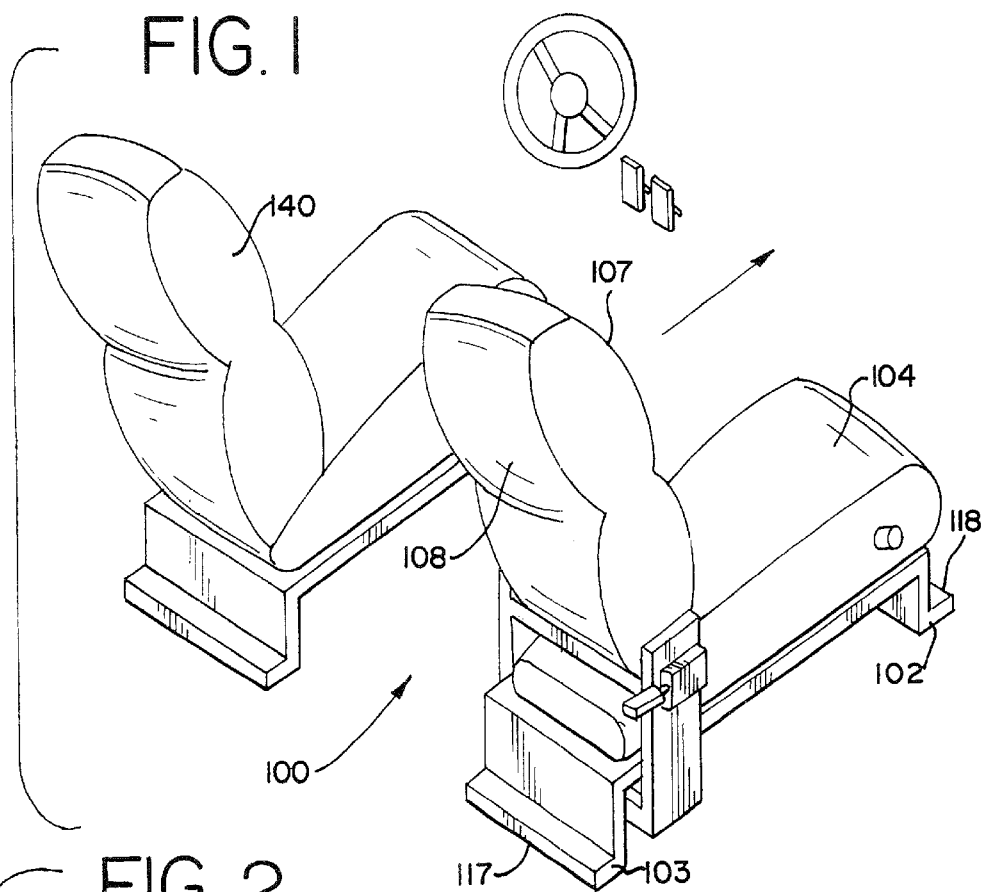
FIG. 1 is a perspective view of an embodiment of a vehicle seat assembly in accordance with the present invention that enables modification for rearward facing passenger seating.
Figure 2:
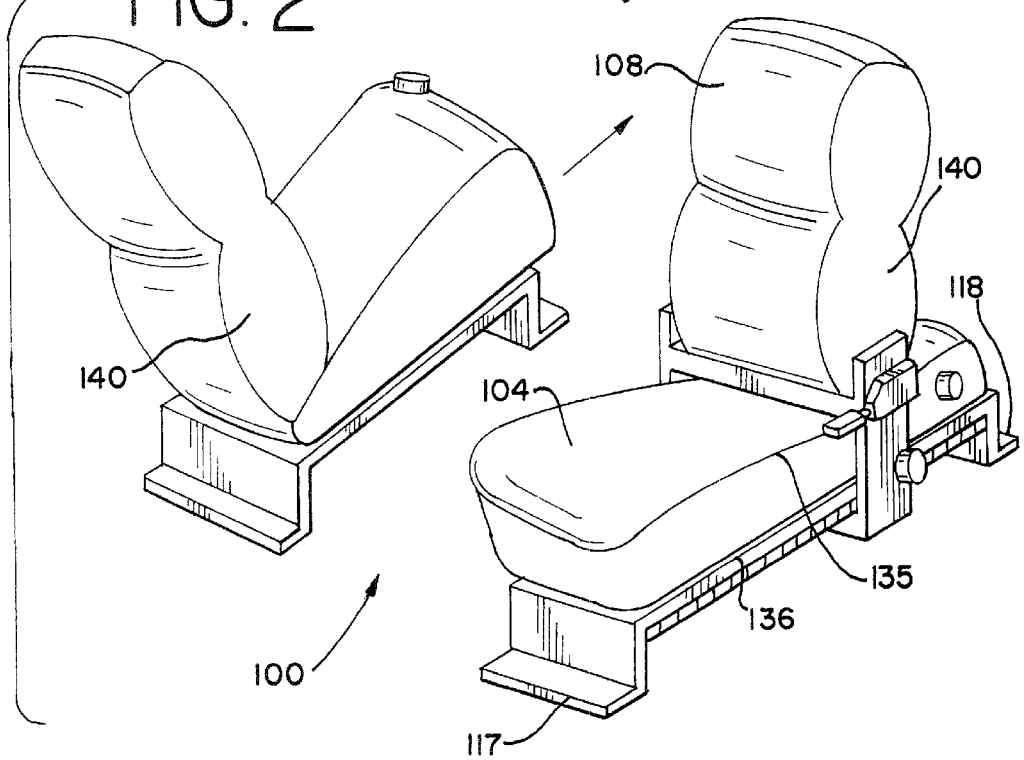
FIG. 2 is a perspective view of the vehicle seat assembly of FIG. 1 but illustrating the movable backrest portion in a forward position on the seat base to facilitate rearward facing passenger seating.

Referring now to the drawings, and in particular to FIGS. 1–5, a vehicle seat 100 for a vehicle (not shown) is constructed in accordance with one embodiment of the present invention. The vehicle seat 100 provides for both occupant travel facing in a forward or first direction, and occupant travel facing in a rearward or second direction. The vehicle seat 100 includes a seat frame 101 having a front flanged edge 102 and a posterior flanged edge 103 for securing the vehicle seat directly to the vehicle floor (not shown). Alternatively, the seat frame 101 can be mounted to a conventional slidable track (not shown) enabling forward and backward positioning of the seat frame 101, if desired.

The vehicle seat 100 includes a seat base 104 mounted on top of the seat frame 101, a back support assembly 105 and a slide assembly 110. The seat base 104 covers the seat frame 101, preferably in a manner spanning an entire length and width of the seat frame 101. The seat base 104 provides cushioned support for a seated occupant and has a variable thickness (t), defined by a top surface 135 and a bottom surface 136 of the seat base 104.

The back support assembly 105 enables occupant travel facing in a forward or first direction and occupant travel facing in a rearward or second direction. The back support assembly 105, including a backrest structure 106, plural support bars 115, and a first mounting plate 111. The backrest structure 106 rests in a generally vertical position, transverse to the seat frame 101. The backrest structure 106 is an integral structure with dual surfaces comprising a first backrest 107 and a second backrest 108 positioned in opposite directions.

When the back support assembly 105 is positioned at the posterior end 117 of the seat frame 101, the first backrest 107, in combination with the seat base 104 and seat frame 101 provide for occupant travel facing in a forward or first direction. To interchangeably provide for occupant travel facing in a rearward or second direction, the back support assembly 105 slides longitudinally from the posterior end 117 of the seat frame 101 to the front end 118 of the seat frame 101. In this arrangement, an occupant resting his back against the second backrest 108, faces in a rearward or second direction.

The back support assembly 105 engages an external track 109 and a slide assembly 110. The external track 109 and slide assembly 110 cooperatively facilitate longitudinal movement of the back support assembly 105 along the seat frame 101.

The back support assembly has support bars 115, which are vertically aligned with a side portion 140 of the backrest structure 106. The side portion 140 of the backrest structure 106 is pivotally mounted to the support bars 115. Preferably, the support bars 115 are bolted or coupled to a lower end of the side portion 140 of the backrest structure 106, in a manner enabling radial adjustment of the backrest structure 106. A radial positioning lever 130 provides radial movement of said backrest structure 106 such that an occupant may adjust the backrest structure 106 to lock in an angular position comfortable for the occupant.

The support bars 115 are attached underneath the seat frame 101 with an interposing first mounting plate 111 as illustrated in FIG. 1. The first mounting plate 111 has two end portions, which are connected to the support bars 115. It is preferable that the first mounting plate 111 is welded to the support bars 115 for an optimally strong connection.

Figure 3:
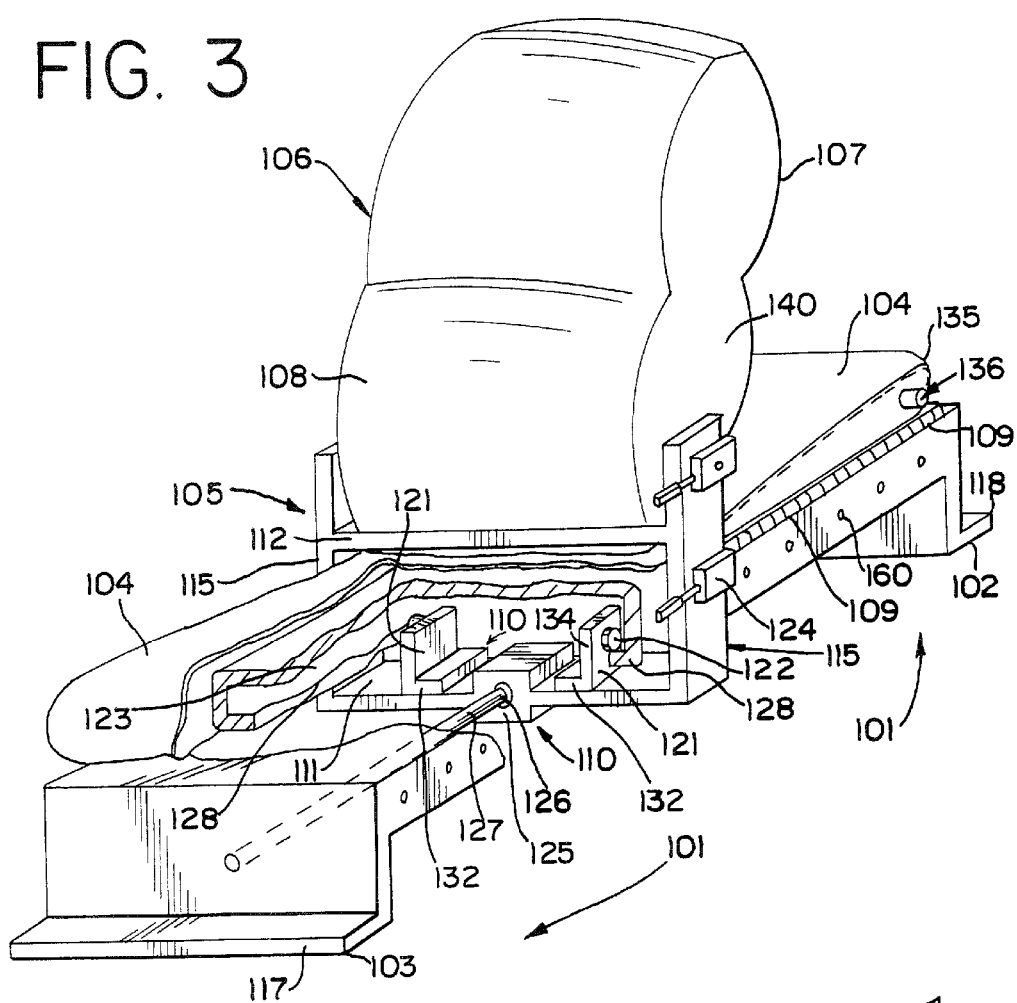
FIG. 3 is a perspective view of the movable backrest assembly of FIG. 1 but with the back support assembly moved to a position mid-length of the seat base and with portions broken away to illustrate the backrest positioning mechanism.
Figure 4:
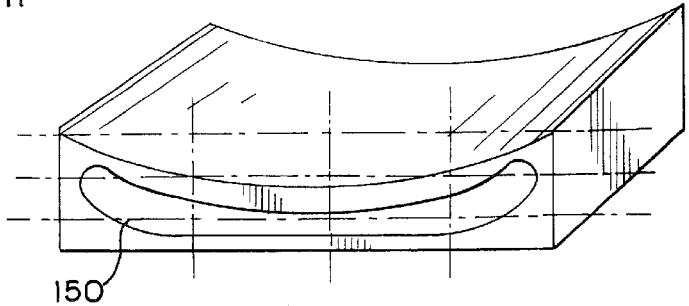
FIG. 4 is a perspective view schematically illustrating the contour of the cushion type seat base employed in the seat assembly of FIGS. 1 and 3 when the backrest is positioned generally mid-length of the seat base.

As previously mentioned, the slide assembly 110 facilitates the longitudinal sliding movement of the back support assembly 105 along the seat frame 101. The slide assembly 110 includes a coupling member 121, which connects the first mounting plate 111 of the back support assembly 105 to a sliding member 122. Preferably, the coupling member 121 has a L-shaped cross-section, as seen in FIG. 3, providing a lower flanged portion 132 for connection to the first mounting plate 111 and an upright portion 134 for connection to the sliding member 122. The L-shaped coupling member 121 can be used in conjunction with a second L-shaped coupling member 121 such that cooperatively each coupling member 121 connect a sliding member 122 to the mounting plate 111, as seen in FIG. 3.

The sliding member 122 cooperatively engages an internal track 123 as illustrated in FIG. 3, such that the sliding member 122 slides along the internal track 123. The sliding member 122 can be a roller, a bearing, a slide rod, or any other device, which provides for low friction sliding in conjunction with an internal track 123.

The internal track 123 is mounted on an opposite side of the seat base 104, which may also be defined as an underside portion of the seat frame 101. The internal track 123 extends from the posterior end 117 of the seat frame 101 to the front end 118 of the seat frame 101 providing a flanged rail 128 for the sliding member 122 to slide from one end of the seat frame 101 to the other end. The internal track 123 may have two or more flanged rails 128 for engagement with multiple sliding members 110, if desired.

The slide assembly 110 includes a cylinder housing 125 and a longitudinal guide rail 127 for providing additional stability to the slide assembly 110 when the back support assembly 105 slides longitudinally along the seat frame 101. The cylinder housing 125 is preferably mounted on top of the first mounting plate 111 in a center portion of the plate to provide maximum support. The cylinder housing 125 has a bore 126 for engaging the longitudinal guide rail 127. The longitudinal guide rail 127 is rigidly connected to the posterior end 117 and frontal end 118 of the seat frame 101 in a manner that provides stabilization of the back support assembly 105 when the back support assembly 105 slides longitudinally along the seat frame 101.

The back support assembly 105 includes a longitudinal positioning lever 129, which operatively engages the external track 109 to control longitudinal positioning of the back support assembly 105 relative to the seat frame 101. The external track 109 is mounted to the side portion of the seat frame 110, extending from the posterior end 117 of the seat frame 101 to the front end 118 of the seat frame 101. The longitudinal positioning lever 129, in a locked position, engages the external track 109, preventing movement of the back support assembly 105 along the external track 109 of the seat frame 101. For example, the longitudinal positioning lever 129 can have a stop (not shown), which rigidly engages a slot 160 on the external track thereby locking the back support assembly 105 in position.

The longitudinal positioning lever 129, in an unlocked position, provides free movement of the back support assembly 105 along the seat frame 101 and external track 109, such that the back support assembly 105 slides from the posterior end 117 of the seat frame 101 to the frontal end 118 of the seat frame 101.

Figure 5:
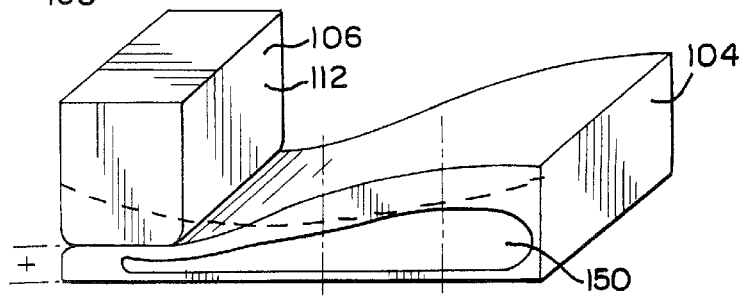
FIG. 5 is a perspective view of the cushion type seat base of FIG. 4 but schematically showing the seat base contour with the backrest applying pressure to an end of the inflated seat base.

As illustrated in FIG. 5, the seat base 104 has an inner chamber 150 containing an impressionable mass (not shown) to provide a resilient cushion. The mass can be fluid such as a gas or liquid or any combination thereof. The thickness (t) of the seat base 104 at a particular location depends on the volume of mass in the inner chamber 150 at that particular portion. The thickness (t) of the seat base 104 at a certain location varies such that when the volume of mass in the inner chamber 150 at a portion decreases, the thickness (t) of the seat base 104 at that corresponding location decreases. Conversely, when the volume of mass at a portion in the inner chamber 150 increases, the thickness (t) of the seat base 104 at that location increases.

The seat base 104 deforms such that when the back support assembly 105 is positioned at the posterior end 117 of the seat frame 101, a bottom portion of the backrest structure 106 depresses the seat base 104 at the posterior end 1117, urging the matter inside the chamber to move from the posterior end 117 of the seat base 104 toward the front end 118, thereby increasing the thickness of the seat base at the front end 118, as illustrated in FIG. 5.

Furthermore, when the back support assembly 105 is positioned at the front end 118 of the seat frame 101, the bottom of the backrest structure 106 depresses the seat base 104 at the front end 118, causing the mass inside the chamber 150 to shift from the front end 118 of the seat base 104 toward the posterior end 117, thereby increasing the thickness of the seat base at the posterior end 117.

If desired, a second mounting plate 112 can be mounted underneath the backrest structure 106 in a position interposed between the support bars 115 such that the second mounting plate 112 depresses the seat base 104 and provides additional support to the back support assembly.

FIGS. 6 and 7 illustrate a vehicle seat 200 constructed in accordance with another embodiment of the present invention. The vehicle seat 200 provides occupant travel in both a forward-facing and rearward-facing position. The vehicle seat 200 comprises a seat frame 201 having a front flanged edge 202 and posterior flanged edge 203 for securing the vehicle seat 201 to the vehicle floor (not shown). Alternatively, the seat frame 202 can be mounted to a conventional slidable track (not shown) on the vehicle floor enabling forward and backward adjustment of the seat frame 201, if desired.

The vehicle seat 200 has a first backrest 204 positioned for occupant travel facing in a forward position or first direction. The seat frame 201 supports a seat base 205 and the first backrest 204. The first backrest 204 is pivotally connected to the posterior end 206 of the seat frame 201 such that a seated occupant, resting his back against the first backrest 204 faces in a forward position or a first direction.

The vehicle seat 200 has a second backrest 207, providing for occupant travel facing in a rearward position or second direction. The second backrest 207 is mounted to the top of the seat base 205. The second backrest 207 can be an assembly for carrying a baby as illustrated in FIGS. 6 and 7.

The lower end of the second backrest 207 has a bore 208 for receiving a support bar 209 of a mounting assembly 210. The support bar 209 is inserted into the bore 208 and securely tightened to the inner wall of the bore 208 with a fastening screw 211. The fastening screw 211 engages the support bar 209, while inside of the bore 208, such that the support bar 209 abuts the inner wall of the bore 208. The fastening screw 211 has a turning knob 212 for tightening the abutment of the fastening screw 211, support bar 209, and the inner wall of the bore 208.

The mounting assembly 210 has a generally rectangular-shaped planar mounting plate 213, which can be securely connected to the floor of the vehicle, preferably adjacent to the front flanged edge 202 of the seat frame 201. Alternatively, instead of securing the mounting assembly 210 to the vehicle floor, the mounting assembly 210 can be directly attached to the front end 223 of the seat frame 201, if desired (not shown).

The mounting assembly 210 includes a mounting plate 213, a support bar 209 and a first housing 214, and an identical second housing 215. The support bar 209 is pivotally mounted between the first and second housings 214, 215, as illustrated in FIGS. 8 and 9. The lower end of the support bar 209 has a guide pin 216, as illustrated in FIG. 11. The first and second housings 214, 215 have a guide slot 217 located preferably in the center of the housings, which receives the guide pin 216. The guide slot 217 is preferably cross-shaped, having a lower branch 218, an upper branch 219 and adjacent side branches 220,220 as illustrated in FIG. 10.

The guide pin 216 locks in the guide slot branches 218 and 220, preventing movement of the support bar 209, when the support bar 209 is positioned in an upright or lowered position. The guide pin 216 locks into the lower branch 218 of the guide slot 217, preventing lateral movement of the support bar 209, when the support bar 209 is in an upright position. The guide pin 216 locks in a side branch 220 of the guide slot 217, when the support bar 209 is in a lowered position. The support bar 209 may be pivotally moved from an upright position, as illustrated by FIG. 8 into a lowered position as illustrated by FIG. 9, by pulling the support bar 209 upward and rotating the support bar 209 approximately 90 degrees, about the y-axis, into a position parallel relative to the mounting plate 213. The support bar 209 may be pivotally moved from a lowered position into an upright position by rotating the bar approximately 90 degrees, about the y-axis, from a lowered position, into an upright position and locking the guide pin 216 into the lower branch 218 of the guide slot 217.

Additional support to the second backrest 207 is provided by using plural support bars 209 and plural housing combinations attached to the mounting plate 213 such that the plural support bars 209 engage plural bores 208 in the second backrest 207. The plural support bars 209 interlock in a lowered position, as seen in FIG. 8.

Figure 12:
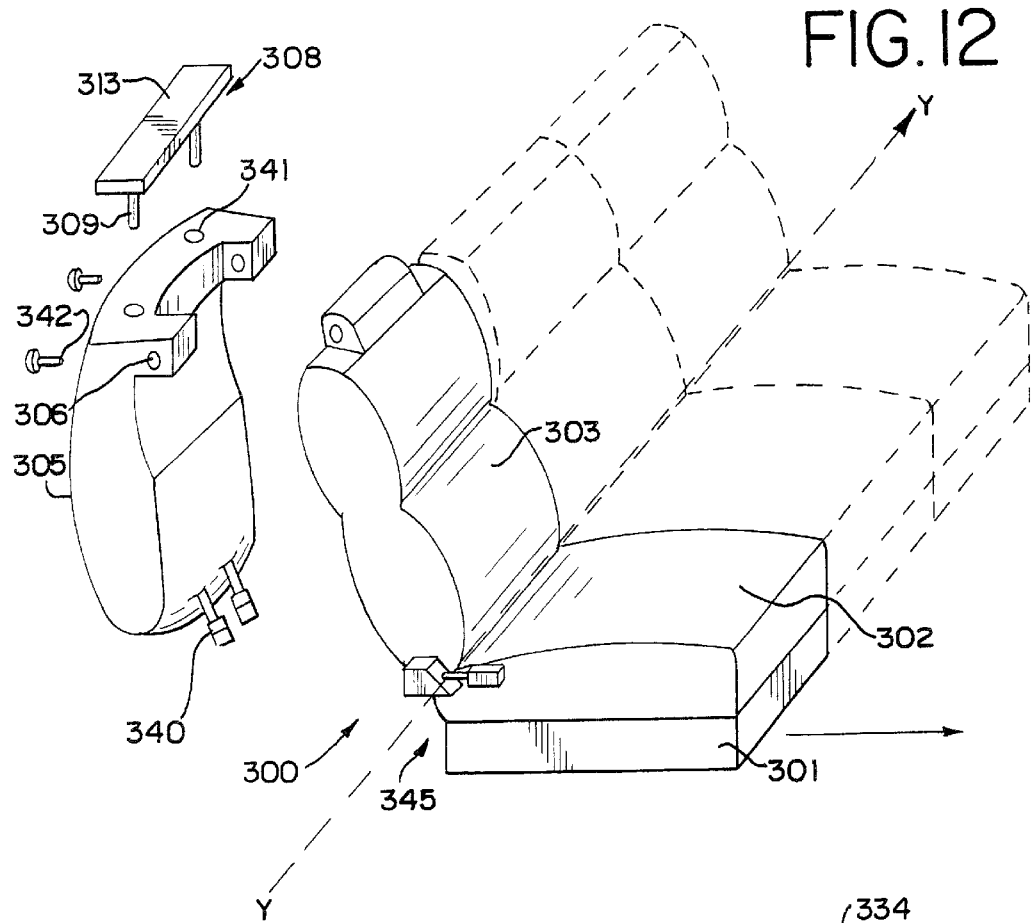
FIG. 12 is a perspective view of another embodiment of a vehicle seat assembly in accordance with the present invention that enables rearwardly facing passenger seating.
Figure 13:
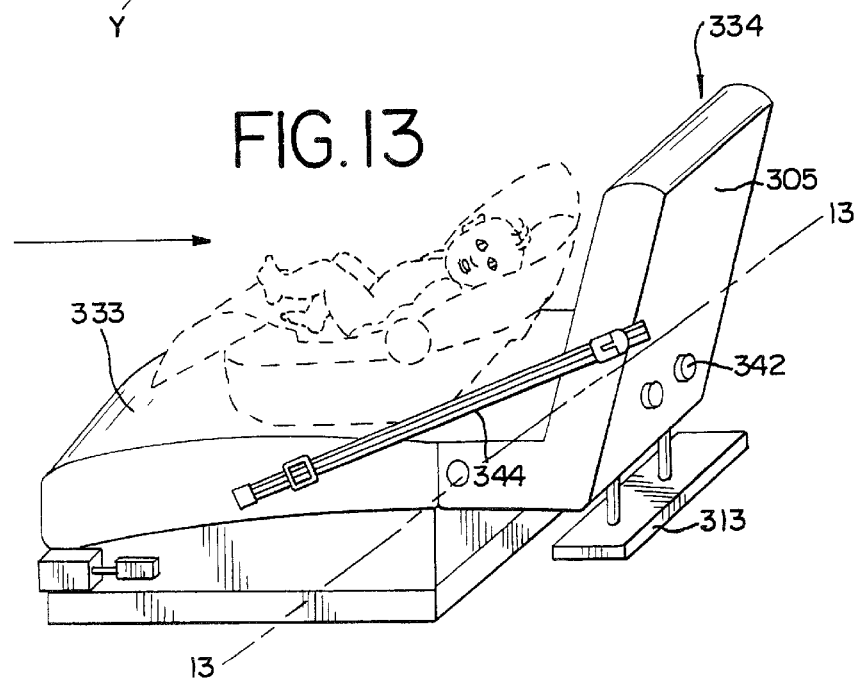
FIG. 13 is an exploded perspective view of the vehicle seat assembly of FIG. 12 but showing the primary backrest returned to its upright position for storing the forward or secondary backrest.

A vehicle seat 300 in accordance with another embodiment of the present invention is illustrated in FIGS. 12 and 13. The vehicle seat 300 includes a seat frame 301, which provides support to a seat base 302. The seat frame 301 has a first backrest 303, which is pivotally connected to the posterior end 345 of the seat frame 301. When the first backrest 303 is positioned in an upright position as shown in FIG. 7, an occupant seated on the seat base 302 faces in a forward position or first direction. A second backrest 305 may be mounted to a back portion 333 of the first backrest 303 providing storage for the second backrest 305 as illustrated in FIG. 12.

The vehicle seat 303 can be modified to provide occupant travel facing in a rearward position or a second direction. This is accomplished by pivoting the first backrest 303 (about the y-axis) from the upright position into a lowered position, as illustrated in FIG. 13. In this configuration, the face of the first backrest 303 horizontally engages the seat base 302 in a parallel position. The back surface 333 of the first backrest 303 forms a second seat base 333. As illustrated in FIG. 13 the second backrest 305, is pivotally connected to the vehicle seat 300, particularly to the first backrest 303, such that an occupant seated on the second seat base 305 with his back resting against the second backrest 305, faces in a rearward position or second direction.

The upper portion of the first backrest 303 and the lower portion of the second backrest 305 have has slotted-bores 306 such that the lower portion of the second backrest 305 may be securely hinged to the upper portion of the first backrest 303 along a hinged axis (line 13—13) using any form of bolting or coupling means 315. The second backrest 305 is hinged to the upper portion of the first backrest 303 such that the second backrest 303 forms a second occupant seat 334.

As aforementioned in the previous embodiment, a mounting assembly 308, particularly a support bar 309 is inserted into the lower portion of the second backrest 305 through a bore 341. The support bar 309 is securely fastened to the inner wall of the bore 341 by a fastening screw 342. The fastening screw 342 is inserted into the back of the second backrest 305, securely fastening the support bar 309 to the inner wall of the bore 341. The mounting plate 313 is securely mounted to the inside of the vehicle. A hinged rod 344 connects preferably the middle portion of the first backrest 303 to preferably the middle portion of the second backrest 305 such that the second backrest 355 is prevented from moving along the hinged axis (13—13). If desired, plural hinged rods 344 can be used for connecting the sides of the first and second backrests 303, 305 for additional support. The second backrest 305 has a seat belt 340 for securing an occupant to the vehicle seat 300.

While preferred embodiments of the present invention have been illustrated and described, it will be understood to those skilled in the art that changes and modifications may be made therein without departing from the invention in its broader aspects. Various features of the invention are defined in the following claims.

What is claimed is:

1. A vehicle seat comprising:
a seat base and a seat frame, said seat frame having a first position at a rear end and a second position at a front end, an external track mounted to a side portion of said seat frame and an internal track mounted to said seat frame, both said tracks extending from said front end to said rear end of said seat frame,
a back support assembly, including a first backrest and a second backrest, operatively associated with said seat frame and said seat base, wherein said back support assembly is longitudinally movable along said seat frame from said first position to said second positions,
said back support assembly being in said first position to enable a seated occupant to rest the occupant's back against said first backrest and face in a first direction;
said back support assembly movable to said second position to enable said seated occupant to rest the occupant's back against said second backrest and face in a second direction.

2. A vehicle seat as defined in claim 1, wherein a back portion of said first backrest is adjacent a back portion of said second backrest,
said first backrest faces in a first direction and said second backrest faces in an opposite direction.

3. A vehicle seat as defined in claim 2 wherein said first backrest and said second backrest comprise an integral backrest structure.

4. A vehicle seat as defined in claim 3 wherein said back support assembly includes at least one support bar operatively associated with at least one mounting plate.

5. A vehicle seat as defined in claim 4 wherein a slide assembly is operatively associated with said seat frame and said back support assembly, enabling longitudinal movement of said back support assembly relative to said seat frame.

6. A vehicle seat as defined in claim 5, wherein said slide assembly includes said internal track mounted to said seat frame and operatively associated with said back support assembly, a sliding member cooperatively engaging said internal track a coupling member for connecting said sliding member to said back support assembly.

7. A vehicle seat as defined in claim 6, wherein a longitudinal positioning lock is in releasable cooperation with said external track, to control longitudinal movement of said back support assembly along said seat frame.

8. A vehicle seat as defined in claim 7 wherein said seat base has an inner chamber containing an impressionable mass.

9. A vehicle seat as defined in claim 8 wherein said seat base has a thickness defined by a top surface of said seat base and a bottom surface of said seat base.

10. A vehicle seat as defined in claim 9 wherein said back support assembly depresses said seat base at a first location, the thickness of said seat base at said first location decreases and the vertical thickness of said seat base at an indeterminate second location increases.

11. A vehicle seat as defined in claim 7, wherein said back support assembly includes a cylinder assembly operatively associated with a control rail, said control rail extending from said rear end to said front end of said seat frame.

12. A vehicle seat as defined in claim 11, wherein said first backrest and said second backrest are pivotally hinged to said support bar, wherein said back support assembly includes a radial positioning lever for controlling pivoted radial movement of said backrests.

13. A vehicle seat comprising a seat frame and a seat base, a seat assembly including a first backrest and a second backrest,
said seat base having a thickness defined by a top surface of said seat base and a bottom surface of said seat base,
said seat assembly operatively associated with said seat frame and said seat base, wherein said seat assembly is longitudinally movable along said seat frame from a first position to a second position,
said seat assembly being arranged in said first position to enable a seated occupant to rest his back against said first backrest and face in a forward or first direction and arranged in said second position to enable the occupant to rest his back against said second backrest and face in a second direction,
a rear portion of said first backrest connected to a rear portion of said second backrest,
said first backrest facing in a first direction and said second backrest facing in a second direction,
said seat assembly including at least one support bar, a first mounting plate, a longitudinal positioning lock and a radial positioning lever, said seat assembly cooperatively engages a slide assembly, wherein said slide assembly including a coupling member for connecting said first mounting plate to a sliding member and an internal track, said internal track extending from a posterior end of said seat frame to a front end of said seat frame, said second mounting plate cooperating with said coupling member and said sliding member engaging said internal track to provide longitudinal sliding movement of said seat assembly relative to said seat frame along said track, said seat frame including an external track mounted to a side portion of said seat frame, wherein said external track extends from the posterior end of said seat frame to the front end of said seat frame, said longitudinal adjustment lock being operatively associated with said support bar being in releasable cooperation with said external track for restraining longitudinal movement of said seat assembly along said seat frame, said seat assembly depressing said seat base in one portion decreasing a thickness at that portion and increasing said thickness in another portion said slide assembly including a cylinder assembly operatively associated with a control rail, said control rail extending from said posterior end to said front end of said seat frame.

14. A vehicle seat comprising; a seat frame and at least one seat base enabling, a person to sit on said seat base, a seat assembly including a first backrest operatively associated with the said seat frame and said seat base in a manner enabling the person to rest his back against the first backrest when sitting on said seat base and facing in a first direction relative to said first backrest, a second backrest for releasable cooperation with said seat frame enabling a person to sit with his back against said second backrest and face in a second direction, wherein said second backrest has at least one support bar cooperative with said second backrest for enabling selective height adjustment of said second backrest relative to said seat base.

15. A vehicle seat as defined in claim 14, wherein said second backrest has a bore to receive said support bar in supporting relation and said support bar is operatively associated with a mounting plate.

16. A vehicle seat as defined in claim 15, wherein said second backrest includes a locking arrangement for releasably maintaining said support bar in fixed position within said bore.

17. A vehicle seat as defined in claim 16, wherein said mounting plate is mounted to a vehicle floor, providing support to said second backrest.

18. A vehicle seat as defined in claim 17, wherein said second backrest is operatively associated with said first backrest, whereby lowering a front portion of said first backrest into a position abutting said seat base, a back portion of said first backrest operates as a second seat base.

19. A vehicle seat as defined in claim 18, wherein said second backrest is pivotally mounted to said first backrest, wherein a lower side portion of said second backrest is connected to an upper side portion of said first backrest wherein a mid-length portion of said first backrest is connected to a mid-length portion of said second backrest.

20. A vehicle seat as defined in claim 17, wherein said seat assembly includes at least one housing operatively associated with said support bar, wherein said support bar has a guide pin, wherein said housing has a guide slot, wherein said guide pin engages said guide slot cooperatively locking said support bar in an upstanding position.

21. A vehicle seat comprising: a seat base and a seat frame, a back support assembly operatively associated with said seat frame and said seat base, including a first backrest, a second backrest, at least one support bar and at least one mounting plate, wherein said first backrest and said second backrest comprise an integral backrest structure such that said first backrest faces in a first direction and said second backrest faces in an opposite direction and a back portion of said first backrest is adjacent to a back portion of said second backrest, wherein said at least one support bar is operatively associated with said at least one mounting plate, said back support assembly is longitudinally movable along said seat frame from a first position at a rear end of said seat frame, to a second position at a front end of said seat frame, said back support assembly being in said first position to enable a seated occupant to rest the occupant's back against said first backrest and face in a first direction;

said back support assembly being in said second position to enable said seated occupant to rest the occupant's back against said second backrest and face in a second direction;

a slide assembly including an internal track, a sliding member, and a coupling member, is operatively associated with said seat frame and said back support assembly, enabling longitudinal movement of said back support assembly relative to said seat frame, wherein said internal track is mounted to said seat frame extending from the rear end of said seat frame to the front end of said seat frame and is operatively associated with said back support assembly, and said sliding member cooperatively engages said internal track and a coupling member for connecting said sliding member to said back support assembly, an external track is mounted to a side portion of said seat frame extending from the car end of said seat frame to the front end of said seat frame.

* * * * *